United States Patent
Praveen et al.

(10) Patent No.: US 7,477,911 B1
(45) Date of Patent: Jan. 13, 2009

(54) METHOD AND SYSTEM FOR FACILITATING A POWER-ON REGISTRATION FOR USE WITH A WIRELESS PUSH TO TALK SYSTEM

(75) Inventors: Atreya Praveen, North Plainfield, NJ (US); Louis P. Ranieri, Lansdale, PA (US); Ian D. de Cone, Bridgewater, NJ (US); Vikram Rawat, Concord, CA (US); Steve Werden, Bridgewater, NJ (US)

(73) Assignee: Cellco Partnership, Bedminster, NJ (US)

( * ) Notice: Subject to any disclaimer, the term of this patent is extended or adjusted under 35 U.S.C. 154(b) by 560 days.

(21) Appl. No.: 11/015,301

(22) Filed: Dec. 16, 2004

(51) Int. Cl.
  *H04B 7/00* (2006.01)
(52) U.S. Cl. .................... 455/518; 455/519; 455/433; 455/435.1
(58) Field of Classification Search .............. 455/518, 455/519, 435.1, 510, 433, 414.1, 90.2, 90.3, 455/517, 560, 432; 370/342, 352, 329, 395.2; 709/203
  See application file for complete search history.

(56) References Cited

U.S. PATENT DOCUMENTS

| | | | |
|---|---|---|---|
| 5,812,948 A * | 9/1998 | Hjern et al. | 455/435.1 |
| 2002/0061759 A1 * | 5/2002 | Maggenti et al. | 455/517 |
| 2003/0027571 A1 * | 2/2003 | Karlsson et al. | 455/433 |
| 2003/0097559 A1 * | 5/2003 | Shimizu et al. | 713/155 |
| 2003/0154243 A1 * | 8/2003 | Crockett et al. | 709/203 |
| 2004/0192364 A1 * | 9/2004 | Ranalli et al. | 455/517 |
| 2004/0199649 A1 * | 10/2004 | Tarnanen et al. | 709/230 |
| 2005/0041648 A1 * | 2/2005 | Bharatia et al. | 370/352 |
| 2005/0169223 A1 * | 8/2005 | Crocker et al. | 370/342 |
| 2006/0072517 A1 * | 4/2006 | Barrow et al. | 370/335 |
| 2006/0072523 A1 * | 4/2006 | Richardson et al. | 370/338 |
| 2006/0073795 A1 * | 4/2006 | Mayblum et al. | 455/90.2 |
| 2006/0114859 A1 * | 6/2006 | Sudo et al. | 370/335 |
| 2006/0116151 A1 * | 6/2006 | Sullivan et al. | 455/519 |
| 2006/0121899 A1 * | 6/2006 | Willey et al. | 455/435.1 |
| 2007/0171861 A1 * | 7/2007 | Akhtar | 370/329 |

* cited by examiner

*Primary Examiner*—Tan Trinh
(74) *Attorney, Agent, or Firm*—McDermott Will & Emery LLP

(57) ABSTRACT

Presented herein is a method and system for facilitating registration of a wireless push to talk device with various network components of a cellular system. In the exemplary embodiment, subsequent attempts to register with the network component are timed according to the Reg_PRD value of the IS-95 System Parameter Message. Other values associated with the applicable wireless carrier protocol may similarly be used.

18 Claims, 3 Drawing Sheets

METHOD AND SYSTEM FOR FACILITATING A POWER-ON REGISTRATION FOR USE WITH A WIRELESS PUSH TO TALK SYSTEM

FIELD OF INVENTION

The present invention is directed to wireless mobile devices and, more particularly, to a method and system for efficiently attempting to register a wireless push to talk device with one or more components of a wireless network.

CROSS-REFERENCE TO RELATED APPLICATIONS

Not applicable.

BACKGROUND OF THE INVENTION

Known push to talk systems exist that allow integration of packetized push to talk functionality with existing circuit switched-based wireless operation. Wireless push to talk mobile devices utilize known commercial cellular systems infrastructure, such as the CDMA-based network that is operated by Verizon Wireless, to support push to talk functionality.

It is known that push to talk functionality on cellular systems is achieved by utilizing the data transport capabilities of the wireless device and related network components of the cellular network, whereby digitized voice is packetized into data packets, such as IP packets, at the wireless device and then transported over various data transport related components of the cellular network. The Session Initiated Protocol (SIP) is typically used in conjunction with a push to talk control server and other relevant data network components, to facilitate push to talk SIP call origination and call maintenance.

Because push to talk connectivity is expected by subscribers to be near instantaneous, wireless push to talk devices generally operate in an "always on" state, whereby the wireless push to talk device remains logged with components of the cellular network that relate to data network functionality. This, in turn, requires that the wireless push to talk device remain registered with the various network components regulating the wireless push to talk device's access to the transport facilities of the cellular network.

Accordingly, a wireless push to talk device first registers, and remains registered, with various network components before it can engage, or be made available to engage, in push to talk conversation. For example, a wireless push to talk device may need to register with a Home Location Register (HLR), an Authentication, Accounting and Authorization server (AAA) and a push to talk control server.

Often times, one or more of the network elements with which registration is required are not available due to any one of various reasons, such as a power outage or software malfunction, thus causing a wireless push to talk device to loose connectivity with the network elements as well as causing it to loose the ability to engage in push to talk activity. Upon loosing connectivity, a wireless push to talk device operating in "always on" mode will immediately attempt to reestablish communications and again register with the network component with which it has lost registration. Upon failure of subsequent registration attempts, the wireless device will continuously make additional attempts to register with the relevant network component until successful. Repeated registration attempts can lead to severe network congestion in situations where hundreds, if not thousands, of wireless push to talk devices are continuously attempting to register with the various network components at the same time. Since, at any given time, only a fraction of push to talk subscribers are attempting to engage in push to talk communications, a continuous attempt by all wireless push to talk devices to register with one or more network components at the same time should be avoided.

SUMMARY

What is desired, therefore, and is provided by the present invention is a method of operation for facilitating registration of a wireless push to talk device that operates on a cellular wireless network that uses a cellular wireless carrier protocol. The method includes the steps of: (1) sending a registration request necessary to allow push to talk operation by the wireless push to talk device; (2) receiving a first indication that the registration request failed; (3) sending the registration request after a first predetermined time period has elapsed; (4) receiving a second indication that the registration request failed; (5) sending the registration request after a second time period, the second time period being different than the first predetermined time period. The second time period is based on a parameter associated with the cellular wireless carrier protocol.

What is further desired is a system that facilitates the registration of a wireless push to talk device operating on a cellular wireless push to talk network that uses a wireless carrier protocol. The system includes: (1) electronic memory containing executable software code, the electronic memory residing on the wireless push to talk device, and; (2) a network element with which the wireless push to talk device is required to register. The executable software code includes instructions for sending a registration request from the wireless push to talk device to the network element server upon the occurrence of a predetermined condition, the executable software code further including instructions to: (1) send an additional registration request to the network element after receiving a first indication that the original registration request failed and after waiting a first predetermined period of time following the indication that the original registration request failed; (2) send a second additional registration request to the network element after receiving an indication that the additional registration request failed and after waiting a second period of time following the indication that the additional registration request failed. The second period of time is based on a parameter provided by the wireless carrier protocol.

Other features, embodiments and variations of the above fall within the scope of the present invention, which is defined solely by the claims which follow hereafter.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF AN EXEMPLARY EMBODIMENT

An exemplary embodiment of a method and system of the present invention will now be described beginning with reference to FIG. 1.

Figure 1:
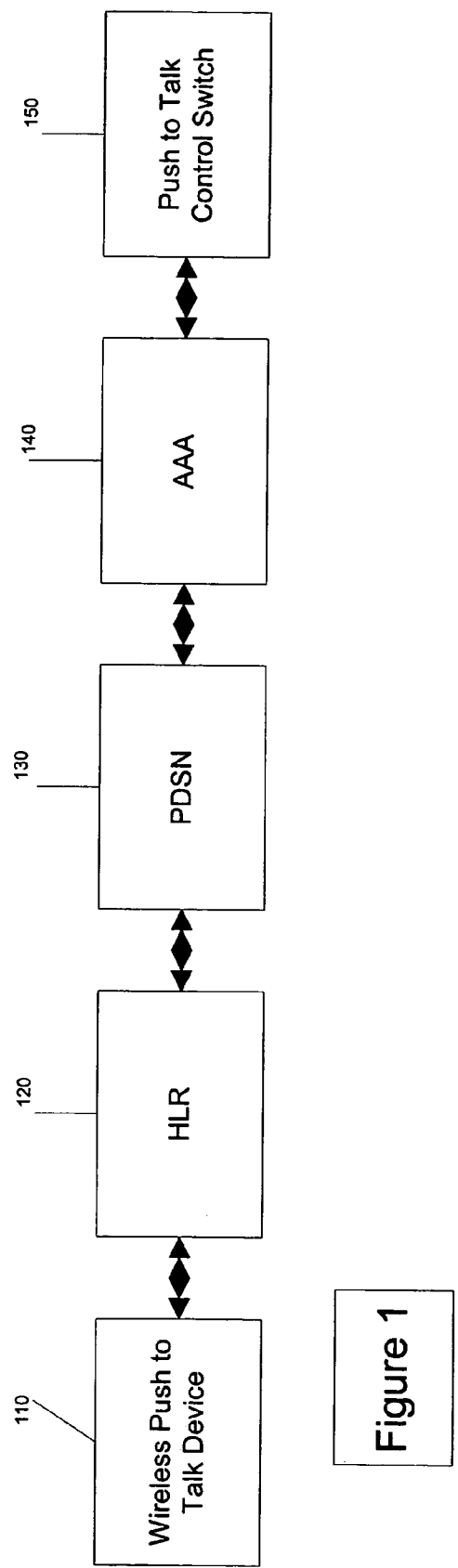
FIG. 1 illustrates, in logical block diagram form, particular components of a wireless network that facilitate push to talk functionality.

FIG. 1 shows, in logical block diagram form, components of a cellular network having the ability to facilitate push to talk connectivity. With continued reference to FIG. 1, block 110 represents a push to talk wireless devices, e.g., a wireless handset device programmed to allow a user to participate in push to talk conversations utilizing digitized voice packets and the known Session Initiated Protocol (SIP) or any of the known variants thereof. A Verizon Wireless v60p phone manufactured by Motorola and operating on Verizon Wireless' cellular CDMA-1X (CDMA 2000) network is an example of one such push to talk wireless device.

Wireless push to talk device 110 includes known components of a cellular wireless phone, including known electronic memory components, which store software code that allows wireless push to talk device 110 to operate similar to an IP data terminal. Use of the Session Initiated Protocol facilitates push to talk voice communications using wireless push to talk device 110 through its data terminal functionality.

Push to talk wireless device 110 is connected via wireless connectivity, e.g., via a CDMA 1X data connection, to a base station (not illustrated), and further connected with a mobile switching center (not illustrated) to allow connectivity to Home Location Register (HLR) 120. HLR 120 contains registration information concerning push to talk wireless device 110 which is used to verify and track the location of wireless device 110, using, e.g., the Mobile Identification Number (MIN), Electronic Serial Number (ESN) and other variables associated with push to talk device 110.

HLR 120 is connected via MSC (not illustrated) to a Packet Data Switching Node (PDSN) 130. PDSN 130 is an IP routing device which, among other functions, is responsible for assigning an IP address to push to talk wireless device 110 to thereby allow push to talk wireless device 110 to communicate via IP with other network components. An example of a known PDSN is an ST-16 PDSN provided by Starent Networks Corporation of Tewkesbury, Mass.

PDSN 130 is, in turn, connected via other known network components (not illustrated) with Authentication, Accounting and Authorization server (AAA) 140. As its name implies, AAA 140 provides authentication, accounting and authorization for wireless subscribers that utilize IP data services. An example of an AAA server is an AAA Service Controller provided by Bridgewater Systems Corporation of Ottawa, Ontario.

With continued reference to FIG. 1, AAA 140 is connected to Push to Talk Control Switch 150. In the present exemplary embodiment, Push to Talk Control Switch 150 is a SIP-based server controller for facilitating and maintaining push to talk conversations via internal soft switching capability using the Session Initiated Protocol or a variant thereof. An example of a known Push to Talk Control Switch is a GIR Control Switch provided by Motorola.

In order for push to talk wireless device 110 to engage in, or be made available to engage in, a push to talk conversation, it first registers, and remains registered, with each of HLR 120, AAA 140 and Push to Talk Control Switch 150.

As is known in the art, various error conditions may prevent or disrupt registration of wireless push to talk device 110 with any of HLR 120, AAA 140 or Push to Talk Control Switch 150 (or any other applicable network component). For example, any of HLR 120, AAA 140 or Push to Talk Control Switch 150 may be out of service due to power failure or may fail to respond for any one of a number of other known reasons.

Figure 2:
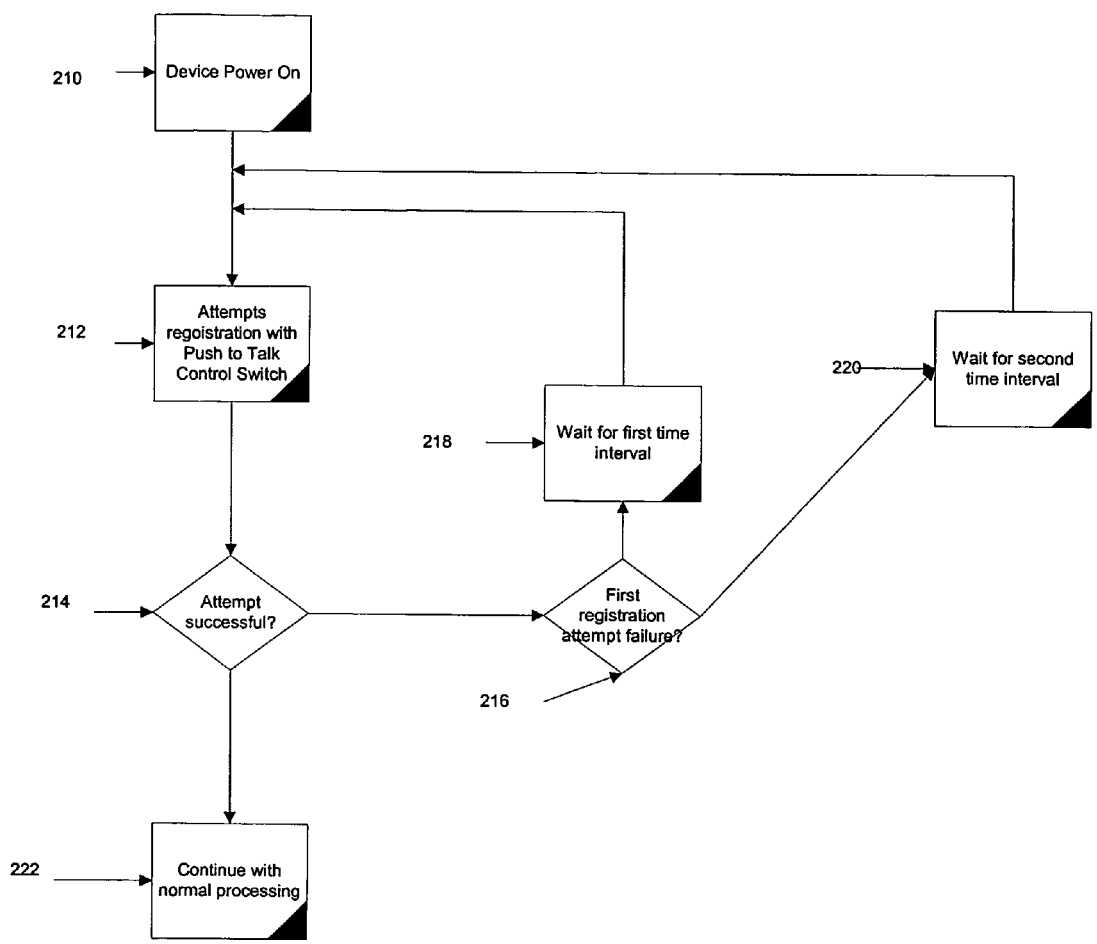
FIG. 2 illustrates, in flow chart form, an exemplary method of operation of a wireless push to talk device.

FIG. 2 illustrates, in flow diagram form, an exemplary embodiment of a method for attempting subsequent registrations with any or all of the above mentioned network components upon failure of a first attempted registration. For the sake of clarity, the method of FIG. 2 will be described with reference to an attempt to register with Push to Talk Control Switch 150, however, it is understood that the method is equally applicable to registration with HLR 120 and AAA 140 or any other network element with which wireless push to talk device 110 must register.

With continued reference to FIG. 2 as well as with reference to the components illustrated in FIG. 1 as described above, wireless push to talk device 110 is powered on at step 210. After having successfully registered with HLR 120 and AAA 140 as well as performed all other known and necessary processes, wireless push to talk device 110 attempts to register with Push to Talk Control Switch 150 at step 212.

At step 214, wireless push to talk device determines if the registration attempt succeeded. If so, the process continues at step 222 with normal processing.

If, however, wireless push to talk device 110 receives an indication that the registration attempt with Push to Talk Control Switch 150 failed or was rejected or if an excessive amount of time passes without receiving any response from Push to Talk Control Switch 150, the process advances to step 216 where wireless push to talk device 110 determines if the present rejection or passage of excessive time is the first occurrence of such in the current process. If so, the process moves to step 218, where a timer in wireless push to talk device 110 is set to a first predetermined interval. In the preferred embodiment, the first predetermined time interval is set to 15 minutes. Other time periods, e.g., ranging from 8 to 25 minutes, may also be applicable depending upon the particular network component and overall network configuration at issue.

Preferably, the first predetermined time interval is programmed into wireless push to talk device 110 during manufacture of the same. Alternatively, the first predetermined interval may be set by the user of wireless push to talk device 110 or controlled via known Over the Air Programming (OTA) techniques.

At the expiration of the timer set to the first predetermined time interval at step 218, the process returns to step 212 and push to talk wireless device 110 again attempts to register with Push to Talk Control Switch 150. The process again moves to step 214 (described above) and if there is another registration failure, the process advances to step 216 where push to talk wireless device recognizes this failure as a second (or greater) failure to register with Push to Talk Control Switch 150 and, therefore, proceeds to step 220.

At step 220, the timer in wireless push to talk device 110 is set to wait a second interval. The second interval is a value that is dependent on the wireless protocol on which the wireless network is operating. In the present exemplary embodiment, which is operating using the CDMA 2000 carrier protocol, the second timer interval is set to the value of the Reg_PRD timer defined in section 3.7.2.3.1 of IS-2000-5, which is hereby incorporated herein by reference in its entirety. Alternatively, the second timer interval is set to a variation of the value determined through utilization of the Reg_PRD value, e.g., the second timer interval may be set to Reg_PRD+5 minutes.

The value of the Reg_PRD timer may easily be determined by wireless push to talk device 110 in the normal manner by reading the value of the Reg_PRD timer from the IS-95 Systems Parameter Message.

At the expiration of the second predetermined interval, the process return to step 212 where the wireless push to talk device makes yet another attempt to register with Push to Talk Control Switch 150. Upon subsequent failure determination at step 214 and determination that such failure is not the first registration failure at step 216, the process will again proceed to step 220 and wireless push to talk device 110 will again set a timer and wait for the predetermined second time interval. As shown in the flow diagram of FIG. 2, this process of setting a timer in wireless push to talk device to, and waiting for, the second predetermined time interval will continue indefinitely until such time as Push to Talk Control Switch 150 registration is deemed successful at step 214, at which point wireless push to talk device will resume normal processing at step 222.

Failure to register with Push to Talk Control Switch 150 may be due to any of various reasons including: (1) the wireless push to talk device not being supported by Push to Talk Control Switch 150; (2) the registration request being corrupted; (3) Push to Talk Control Switch 150 being temporarily unavailable; or (4) Push to Talk Control Switch 150 being unable to process the request. In these and other situations, the above-described process of FIG. 2 may be utilized to control subsequent registration attempts with Push to Talk Control Switch 150.

Variations of the present invention may be realized. For example, wireless push to talk device 110 may be programmed to recognize and distinguish certain registration failures and treat such failures in a specialized manner. Thus, upon receiving a first or second registration failure due to wireless push to talk device 110 not being supported by Push to Talk Control Switch 150, wireless push to talk device 110 will cease further attempts to register with Push to Talk Control Switch 150. In this exemplary situation, Push to Talk Control Server 150 may not recognize push to talk device 110 because the subscriber to whom wireless push to talk device 110 belongs may have decided to unsubscribe to push to talk service or for some other payment-related reason. In such a situation, the registration request failure will not be resolved by the passage of time, but, instead, will require proactive intervention by a network operator.

As mentioned previously, the exemplary method for attempting registration with Push to Talk Control Switch 150 and, upon failure, attempting subsequent registration, is equally applicable to attempts by wireless push to talk device 110 to register with other relevant network components, such as HLR 120 and AAA 140.

Figure 3:
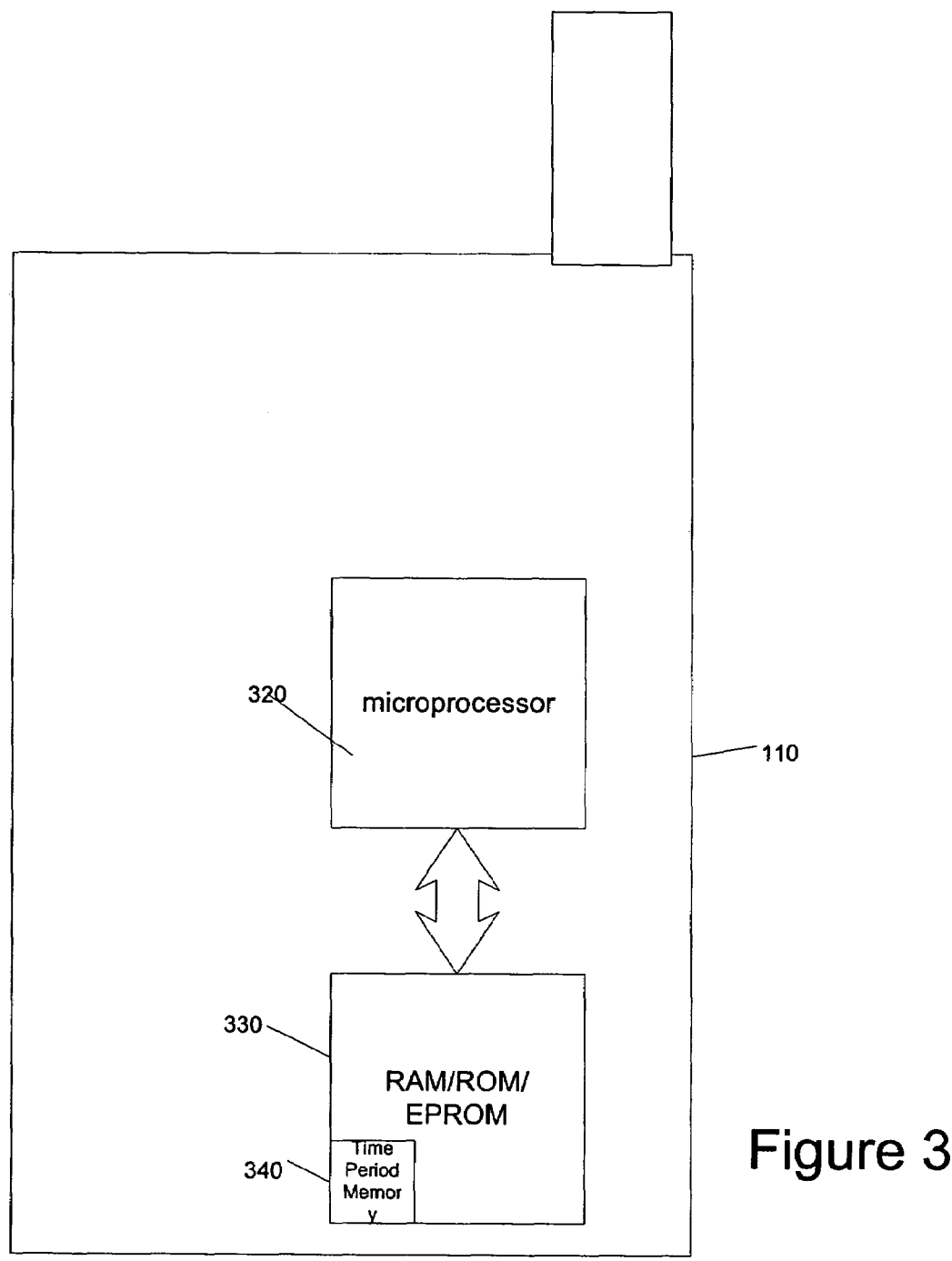
FIG. 3 illustrates particular components of a wireless push to talk device.

FIG. 3 is a logical block diagram representing an exemplary embodiment of wireless push to talk device 110. Wireless push to talk device 110 includes all of the normal components of known mobile telephone devices, including a microprocessor 320 for controlling the operation of wireless push to talk device 110 and memory component 330 for storing electronic data necessary to facilitate operation of microprocessor 320 and the attendant code that controls operation of microprocessor 320. Microprocessor 320 and memory component 330 preferably together operate in a known manner to execute the process illustrated in FIG. 2.

As shown in FIG. 3, memory component 330 may be any one, or combination, of RAM, ROM or EPROM or any known equivalent thereof. Additionally, one skilled in the art will appreciate that microprocessor 310 may be manufactured to include therein the necessary memory storage to facilitate operation, without the need for additional memory component 330.

Memory component 330 of wireless push to talk device further includes time period memory 340. Time period memory 340 is a dynamic or static portion of electronic memory in memory component 330 used to store the first and second predetermined intervals discussed above with reference to the process of FIG. 2. Microprocessor 320 references time period memory 340 during operation of the process of FIG. 2 to determine the amount to time to wait during successive registration attempts to register with any of HLR 120, AAA 140 or Push to Talk Control Switch 150.

It is understood that the requisite knowledge to implement the present system and method will fall well within the scope of competence of one skilled in the art of programming mobile handset devices that allow digitized push to talk communications. Moreover, although the exemplary embodiment was described with reference to a CDMA 1X network, it is understood that the present invention may be implemented in any wireless data network utilizing any carrier protocol, e.g., GSM and related protocols, that provides a Reg_PRD or similar timing variable.

Also, although the present exemplary embodiment is discussed in terms of a method that occurs at handset device power on, it is understood that it may likewise operate at other times when connectivity and registration is lost with relevant network components and subsequently attempted, e.g., following an error condition that necessitates the sending of a registration request by the wireless device.

The above-described exemplary embodiments are meant merely to illustrate the nature of the present invention, the scope of which is solely defined by the claims that follow.

What is claimed as new and desired to be protected by Letters Patent of the United States is:

1. A method of operating a wireless device for push to talk, comprising steps of:
   (a) receiving a system message in accordance with a cellular wireless carrier protocol, from a cellular wireless network, in the wireless device;
   (b) obtaining a parameter associated with the cellular wireless carrier protocol, from the received message;
   (c) sending a request for a registration, needed to allow the wireless device to conduct push to talk communication via the cellular wireless network, from the wireless device and intended for a network element with which the wireless device is required to register in order to conduct the push to talk communication;
   (d) following failure of the request for registration, delaying a first period of time pre-set in the wireless device;
   (e) after the first period of time, re-sending the request for the registration, from the wireless device and intended for said network element;
   (f) following failure of the re-sent request for registration, delaying a second period of time different from the first period of time, the second period of time being based on the parameter associated with the cellular wireless carrier protocol obtained from the received message; and
   (g) after the second period of time, again re-sending the request for registration, from the wireless device and intended for said network element.

2. The method of claim 1, wherein the push to talk communication via the cellular wireless network requires registration with one or more of a Home Location Register and an Authentication Accounting and Authorization server.

3. The method of claim 1, wherein the request for the registration is a signaling message for communication through the cellular wireless network, intended for a Push to Talk Control Switch, requesting registration of the wireless device with the Push to Talk Control Switch, for obtaining push to talk communication service via the cellular wireless network.

4. The method of claim 3, wherein the signaling message uses Session Initiation Protocol.

5. The method of claim 1, wherein each of the failures of the request for registration is detected upon receiving an indication of at least one condition of the group comprising:
   (1) the wireless device not being supported by a network device to which the request for registration was sent;
   (2) the request for registration being corrupted;
   (3) the network element to which the request for registration was directed being temporarily unavailable; and
   (4) the network element to which the request for registration was directed being unable to process the request for registration.

6. The method of claim 1, wherein one or more of the failures of the request for registration is detected upon the wireless device failing to receive a response.

7. The method of claim 1, wherein:
   the system message is an IS-95 system parameter message; and
   the parameter is a Reg_PRD variable of the IS-95 system parameter message.

8. The method of claim 1, wherein step (c) occurs when the push to talk device is first powered on.

9. The method of claim 1, wherein step (c) occurs following an error condition that necessitates the sending of a registration request by the wireless device to a network element with which registration has been lost.

10. The method of claim 1, wherein steps (f) and (g) are repeated until registration is successful.

11. A wireless push to talk device for operation on a cellular wireless network, comprising:
   a microprocessor running software to facilitate transmissions of requests for registration from the wireless push to talk device through the network to a component, for obtaining push to talk service through the network;
   memory storage, storing a pre-set value indicative of a first time period and for storage of a value indicative of a second time period different from the first time period,
   wherein the software causes the microprocessor to operate the wireless push to talk device to perform operations, including:
   (a) receiving a system message in accordance with a cellular wireless carrier protocol, from the cellular wireless network, in the wireless push to talk device;
   (b) obtaining a parameter associated with the cellular wireless carrier protocol, from the received system message;
   (c) obtaining the value indicative of the second time period based on the parameter associated with the cellular wireless carrier protocol obtained from the received system message, and storing the obtained value in the memory storage;
   (d) sending a request for a registration, needed to allow the wireless push to talk device to conduct push to talk communication via the cellular wireless network, from the wireless push to talk device and intended for a network element with which the wireless device is required to register in order to conduct the push to talk communication;
   (e) following failure of the request for registration, delaying for the first time period, based on the pre-set value indicative of the first time period in the memory storage;
   (f) after the first period of time, re-sending the request for the registration, from the wireless push to talk device and intended for said network element;
   (g) following failure of the re-sent request for registration, delaying the second time period, based on the stored value indicative of the second time period; and
   (h) after the second period of time, again re-sending the request for registration, from the wireless push to talk device and intended for said network element.

12. The device of claim 11, wherein the software configures the microprocessor, such that each operation of sending the request for the registration involves transmission of a signaling message for communication through the cellular wireless network, intended for a Push to Talk Control Switch, requesting registration of the wireless push to talk device with the Push to Talk Control Switch.

13. The device of claim 11, wherein the signaling message uses Session Initiation Protocol.

14. The device of claim 11, wherein the software configures the microprocessor, such that in operation of the wireless push to talk device, the device:
   receives an IS-95 system parameter message as the system message; and
   uses a Reg_PRD variable of the IS-95 system parameter message as the parameter on which the value indicative of the second time period is based.

15. The device of claim 11, wherein the set value in storage sets the first time period between 8 and 25 minutes.

16. The device of claim 15, wherein the set value in storage sets the first time period to about 15 minutes.

17. The device of claim 11, wherein the value in storage indicative of the first time period is set in the memory by the manufacturer of the device.

18. The device of claim 11, wherein the set value in storage indicative of the first time period is programmed into the memory using over the air communications with the device via the cellular wireless network.

* * * * *

UNITED STATES PATENT AND TRADEMARK OFFICE
CERTIFICATE OF CORRECTION

PATENT NO. : 7,477,911 B1   Page 1 of 1
APPLICATION NO. : 11/015301
DATED : January 13, 2009
INVENTOR(S) : Praveen Atreya et al.

It is certified that error appears in the above-identified patent and that said Letters Patent is hereby corrected as shown below:

On the title page of the patent:

In Item "(75) Inventors", change the name of the first inventor from

"Atreya Praveen" to --Praveen Atreya--.

Signed and Sealed this

Twenty-ninth Day of September, 2009

David J. Kappos
*Director of the United States Patent and Trademark Office*